(12) United States Patent
Sakurai (10) Patent No.: US 12,548,864 B2
(45) Date of Patent: Feb. 10, 2026

(54) TERMINAL COMPONENT FORMED BY ULTRASONIC JOINING AND CRIMPING

(71) Applicant: PRIME PLANET ENERGY & SOLUTIONS, INC., Tokyo (JP)

(72) Inventor: Takahiro Sakurai, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 675 days.

(21) Appl. No.: 17/861,692

(22) Filed: Jul. 11, 2022

(65) Prior Publication Data

US 2023/0015845 A1   Jan. 19, 2023

(30) Foreign Application Priority Data

Jul. 15, 2021 (JP) .................................. 2021-117092

(51) Int. Cl.
*H01M 50/566* (2021.01)
*H01M 50/552* (2021.01)
*H01M 50/564* (2021.01)

(52) U.S. Cl.
CPC ....... *H01M 50/566* (2021.01); *H01M 50/552* (2021.01); *H01M 50/564* (2021.01)

(58) Field of Classification Search
CPC .. H01M 50/55; H01M 50/553; H01M 50/562; H01M 50/176; H01M 50/566
See application file for complete search history.

(56) References Cited

U.S. PATENT DOCUMENTS

| | | |
|---|---|---|
| 2002/0061438 A1 | 5/2002 | Inoue et al. |
| 2003/0170535 A1 | 9/2003 | Watanabe et al. |
| 2005/0100785 A1 | 5/2005 | Enomoto et al. |
| 2011/0052970 A1 | 3/2011 | Kurata et al. |
| 2011/0081572 A1 | 4/2011 | Byun et al. |
| 2011/0104566 A1 | 5/2011 | Byun et al. |
| 2011/0195296 A1 | 8/2011 | Kim et al. |

(Continued)

FOREIGN PATENT DOCUMENTS

| | | |
|---|---|---|
| CN | 102544423 A | 7/2012 |
| CN | 103227311 A | 7/2013 |

(Continued)

OTHER PUBLICATIONS

Final Office Action dated Aug. 31, 2023, in U.S. Appl. No. 17/404,454.

(Continued)

*Primary Examiner* — Imran Akram
(74) *Attorney, Agent, or Firm* — Finnegan, Henderson, Farabow, Garrett and Dunner, LLP (57) ABSTRACT

The terminal component disclosed herein is a terminal component for use in a terminal for secondary batteries. The terminal component includes a first metal and a second metal having a recess. The first metal includes a shaft having a pair of flat surfaces and a fitting portion formed at one end of the shaft in the major axis direction. At the boundary between the first metal and the second metal, a joining portion joined by ultrasonic, joining and a crimping portion where the fitting portion of the first metal is fitted into the recess of the second metal are formed. A gap is formed between the recess and the fitting portion in the facing direction in which the gap faces the flat surfaces in plan view.

7 Claims, 4 Drawing Sheets

(56) References Cited

U.S. PATENT DOCUMENTS

| | | |
|---|---|---|
| 2011/0244309 A1 | 10/2011 | Byun et al. |
| 2012/0148908 A1 | 6/2012 | Ito |
| 2012/0214030 A1 | 8/2012 | Guen |
| 2013/0196192 A1 | 8/2013 | Harada |
| 2013/0224536 A1 | 8/2013 | Hattori et al. |
| 2014/0178746 A1 | 6/2014 | Ono |
| 2015/0086844 A1 | 3/2015 | Masuda |
| 2015/0086867 A1 | 3/2015 | Oda et al. |
| 2015/0136839 A1 | 5/2015 | Kanryo et al. |
| 2015/0140391 A1 | 5/2015 | Sakate et al. |
| 2015/0183052 A1 | 7/2015 | Murakami et al. |
| 2015/0221926 A1 | 8/2015 | Yoshitake et al. |
| 2015/0243955 A1 | 8/2015 | Kang |
| 2015/0295221 A1 | 10/2015 | Urano et al. |
| 2015/0318519 A1 | 11/2015 | Tsutsumi et al. |
| 2015/0333312 A1* | 11/2015 | Nakamoto .......... H01M 50/516 429/153 |
| 2015/0380712 A1 | 12/2015 | Tsunaki et al. |
| 2016/0043353 A1 | 2/2016 | Tsutsumi et al. |
| 2016/0118641 A1 | 4/2016 | Oda et al. |
| 2016/0254517 A1 | 9/2016 | Tsunaki et al. |
| 2016/0372722 A1 | 12/2016 | Yoshida et al. |
| 2017/0054131 A1 | 2/2017 | Yokota et al. |
| 2017/0229700 A1 | 8/2017 | Matsumoto et al. |
| 2018/0085847 A1 | 3/2018 | Sato |
| 2018/0207745 A1 | 7/2018 | Hori et al. |
| 2018/0294465 A1 | 10/2018 | Nagai et al. |
| 2018/0331348 A1 | 11/2018 | Kobayashi |
| 2018/0358603 A1 | 12/2018 | Nakayama et al. |
| 2019/0044107 A1 | 2/2019 | Ito |
| 2019/0054562 A1 | 2/2019 | Miyashiro et al. |
| 2019/0221791 A1 | 7/2019 | Wakimoto |
| 2019/0273240 A1 | 9/2019 | Hagino et al. |
| 2020/0035964 A1 | 1/2020 | Zhang et al. |
| 2020/0075923 A1 | 3/2020 | Takabayashi et al. |
| 2020/0091492 A1 | 3/2020 | Guen |
| 2020/0243868 A1 | 7/2020 | Takabayashi et al. |
| 2020/0358071 A1 | 11/2020 | Kawanishi |
| 2021/0175510 A1 | 6/2021 | Yoneda et al. |
| 2022/0085463 A1 | 3/2022 | Suzuki et al. |
| 2022/0085467 A1 | 3/2022 | Suzuki et al. |
| 2022/0085468 A1 | 3/2022 | Suzuki et al. |
| 2022/0085469 A1 | 3/2022 | Suzuki et al. |
| 2023/0039284 A1 | 2/2023 | Sakurai et al. |

FOREIGN PATENT DOCUMENTS

| | | |
|---|---|---|
| CN | 105830253 A | 8/2016 |
| CN | 106575741 A | 4/2017 |
| CN | 107848064 A | 3/2018 |
| CN | 110048065 A | 7/2019 |
| CN | 209880722 U | 12/2019 |
| CN | 110875462 A | 3/2020 |
| CN | 111183536 A | 5/2020 |
| CN | 112909345 A | 6/2021 |
| EP | 2490282 A1 | 8/2012 |
| EP | 3062370 A1 | 8/2016 |
| EP | 3179537 A1 | 6/2017 |
| EP | 3467906 A1 | 4/2019 |
| EP | 3 972 042 A1 | 3/2022 |
| FR | 2 732 417 A1 | 10/1996 |
| JP | H 07224944 A | 8/1995 |
| JP | H 09219204 A | 8/1997 |
| JP | H 11283588 A | 10/1999 |
| JP | 2000-082487 A | 3/2000 |
| JP | 2000-082847 A | 3/2000 |
| JP | 2000-164195 A | 6/2000 |
| JP | 2001-126706 A | 5/2001 |
| JP | 2001-357834 A | 12/2001 |
| JP | 2004-220963 A | 8/2004 |
| JP | 2005-019213 A | 1/2005 |
| JP | 2005-285406 A | 10/2005 |
| JP | 2007-026945 A | 2/2007 |
| JP | 2009-087728 A | 4/2009 |
| JP | 2009-110808 A | 5/2009 |
| JP | 2011-077039 A | 4/2011 |
| JP | 2011-124024 | 6/2011 |
| JP | 2011-210725 A | 10/2011 |
| JP | 2012-174452 A | 9/2012 |
| JP | 2012-190636 A | 10/2012 |
| JP | 2013-075297 A | 4/2013 |
| JP | 2013093287 A | 5/2013 |
| JP | 2013-157156 A | 8/2013 |
| JP | 2014-127277 A | 7/2014 |
| JP | 2014-146498 A | 8/2014 |
| JP | 2014-526962 A | 10/2014 |
| JP | 2015-011785 A | 1/2015 |
| JP | 2015-030007 A | 2/2015 |
| JP | 2015-056273 A | 3/2015 |
| JP | 2015-059826 A | 3/2015 |
| JP | 2015-060730 A | 3/2015 |
| JP | 2015-088443 A | 5/2015 |
| JP | 2015-088464 A | 5/2015 |
| JP | 2015-099759 A | 5/2015 |
| JP | 2015-153521 A | 8/2015 |
| JP | 2015-162460 A | 9/2015 |
| JP | 2016-018675 A | 2/2016 |
| JP | 2016-058215 A | 4/2016 |
| JP | 2016-081873 A | 5/2016 |
| JP | 2016-085961 A | 5/2016 |
| JP | 2016-115458 A | 6/2016 |
| JP | 2016-129125 A | 7/2016 |
| JP | 2016-132131 A | 7/2016 |
| JP | 2016-192285 A | 11/2016 |
| JP | 2016-207433 A | 12/2016 |
| JP | 2016-207510 A | 12/2016 |
| JP | 2017-027819 A | 2/2017 |
| JP | 6087413 B1 | 3/2017 |
| JP | 2017-111896 A | 6/2017 |
| JP | 6216368 | 10/2017 |
| JP | 2017-228418 A | 12/2017 |
| JP | 2018-181552 A | 11/2018 |
| JP | 2019-009045 A | 1/2019 |
| JP | 2020-107473 A | 7/2020 |
| JP | 2020102320 A | 7/2020 |
| JP | 2020-119874 A | 8/2020 |
| KR | 2016-0107938 A | 9/2016 |
| KR | 2019-0124039 A | 11/2019 |
| WO | WO 2012/118014 A1 | 9/2012 |
| WO | WO 2012/169055 A1 | 12/2012 |
| WO | WO 2013-013083 A2 | 1/2013 |
| WO | WO 2014-042005 A1 | 3/2014 |
| WO | WO 2014-103874 A1 | 7/2014 |
| WO | WO 2015-060175 A1 | 4/2015 |
| WO | WO 2016/020996 A1 | 2/2016 |
| WO | WO 2017-141694 A1 | 8/2017 |

OTHER PUBLICATIONS

Office Action dated Oct. 13, 2023, in U.S. Appl. No. 17/404,616.
Advisory Action Before the Filing of an Appeal Brief dated Oct. 12, 2023, in U.S. Appl. No. 17/876,054.
Schmidt et al. "Joining of lithium-ion batteries using laser beam welding: Electrical losses of welded aluminum and copper joints", ICALEO 2012, p. 915-923.
Dhara et al. "Impact of ultrasonic welding on multi-layered Al—Cu joint for electric vehicle battery applications: A layer-wise microstructural analysis" Materials Science & Engineering A, 791, (Jun. 2020) 139795, pp. 1-18.
Office Action dated Aug. 30, 2022, issued in U.S. Appl. No. 17/409,990.
Office Action dated Dec. 29, 2022, issued in U.S. Appl. No. 17/404,355.
Office Action dated Feb. 1, 2023, issued in U.S. Appl. No. 17/404,616.
Office Action dated Feb. 16, 2023, issued in U.S. Appl. No. 17/876,054.
Office Action dated Feb. 22, 2023, issued in U.S. Appl. No. 17/404,454.
Final Office Action dated Apr. 4, 2023, issued in U.S. Appl. No. 17/404,355.

(56) References Cited

OTHER PUBLICATIONS

Notice Of Allowance dated Mar. 8, 2023, issued in U.S. Appl. No. 17/409,990.
Final Office Action dated Jun. 15, 2023, issued in U.S. Appl. No. 17/404,616.
Final Office Action dated Jun. 15, 2023, issued in U.S. Appl. No. 17/876,054.
Office Action issued in U.S. Appl. No. 17/404,454 dated Mar. 13, 2024.
"Mechanical Manufacturing Inspection Technique, Thermal Processing Section," pp. 487-488, Mar. 1988.
Office Action in CN 202111086085.6, dated Mar. 20, 2024.
Notice of Allowance and Notice of Allowability in U.S. Appl. No. 17/876,054, dated Apr. 15, 2024.
Notice of Allowance and Notice of Allowability in U.S. Appl. No. 17/404,616, dated May 22, 2024.
Zhixiang, C., "Welding Process of Ships," Harbin Institute of Technology Press, Mar. 31, 2015, pp. 149-150.
Office Action in CN 202111080245.6, dated Jun. 28, 2024.
Final Office Action in U.S. Appl. No. 17/404,454, dated Jul. 19, 2024.
"EAA Aluminum Automotive Manual-Joining," 8. Metal Joining, The Aluminum Automotive Manual, European Aluminium Association, 2015, pp. 1-66.
Non Final Office Action dated Aug. 15, 2023, issued in U.S. Appl. No. 17/404,355.
Non-Final Office Action in U.S. Appl. No. 17/404,454, dated Nov. 19, 2024.
Non-Final Office Action in U.S. Appl. No. 17/404,355, dated Nov. 18, 2024.
Ni, Z. L., et al., "Dissimilar Joining of Aluminum to Copper Using Ultrasonic Welding," Materials and Manufacturing Processes, 2016, 31, pp. 2091-2100.
Office Action issued in U.S. Appl. No. 17/876,054 dated Jan. 11, 2024.
Final Office Action issued in U.S. Appl. No. 17/404,355 dated Jan. 31, 2024.
Final Office Action issued in U.S. Appl. No. 17/404,616 dated Feb. 16, 2024.
Zhang, Zhigiang et al., "Effects of Ultrasonic Assisted Friction Stir Welding on Flow Behavior, Microstructure and Mechanical Properties of 7N01-T4 Aluminum Alloy Joints," Journal of Materials Science & Technology, vol. 43 (2020), pp. 1-13.
Final Office Action issued in U.S. Appl. No. 17/404,355, dated May 16, 2025.
Final Office Action issued in U.S. Appl. No. 17/404,454, dated May 19, 2025.
Notice of Allowance issued in U.S. Appl. No. 17/404,355, dated Nov. 25, 2025.

\* cited by examiner

TERMINAL COMPONENT FORMED BY ULTRASONIC JOINING AND CRIMPING

CROSS REFERENCE TO RELATED APPLICATIONS

The present application is based upon and claims the benefit of priority from Japanese patent application No. 2021-117092 filed on Jul. 15, 2021, and the entire disclosure of which is incorporated herein its entirety by reference.

The present disclosure relates to a terminal component and a method for manufacturing the same.

BACKGROUND

A technology has been proposed for terminals made of dissimilar metals as terminals constituting secondary batteries.

Japanese Patent Application Publication No. 2011-124024 discloses an assembled battery obtained by connecting multiple single batteries by busbars. As a method for making cathode terminals for such assembled batteries, it is disclosed that copper positive electrode external terminals are ultrasonically joined to an aluminum base, foreign matters generated by ultrasonic joining is cleaned, and then the terminals are further crimp-molded. The crimp-molding herein is performed by pressing with a projected punching tool and a recessed die tool. According to Japanese Patent Application Publication No. 2011-124024, such a positive electrode terminal is said to have good weldability with a copper busbar and sufficient joining strength between the basal portion and the external terminal.

Japanese Patent No. 6216368 discloses a power storage element having an electrode body, a case housing the electrode body, a rivet member fixed to a partition of the case and having an insertion portion at one end, and an electroconductive member having an insertion target portion and being electrically connected with the rivet member. The Vickers hardness of the insertion portion of the rivet is greater than the Vickers hardness of the portion surrounding the insertion target portion in the electroconductive member. The insertion portion is crimped with being inserted into the electroconductive member. This reduces the thickness of the portion surrounding the insertion target portion and reduces the increase in the thickness of the electroconductive member.

SUMMARY

Electroconductivity between dissimilar metals constituting external terminals can be improved by joining them by ultrasonic joining or other methods. The joining strength between dissimilar metals can be improved by mechanically fastening them together using a method such as crimping. The prevent inventors have been considering using a combination of these methods for terminals in secondary batteries. However, when ultrasonic vibration is performed with dissimilar metals crimped, there is a concern that the crimped structure will interfere with the ultrasonic vibrations applied during ultrasonic joining.

The terminal component disclosed herein is a terminal component for use in a terminal for secondary batteries. The terminal component includes a first metal and a second metal having a recess. The first metal includes a shaft having a pair of flat surfaces and a fitting portion formed at one end of the shall in the major axis direction. At the boundary between the first metal and the second metal, a joining portion joined by ultrasonic joining and a crimping portion where the fitting portion of the first metal is fitted into the recess of the second metal are formed. A gap is formed between the recess and the fitting portion in a facing direction in which the gap faces the flat surfaces in plan view.

In the terminal component with this configuration, the joining strength of the joining portion joined by ultrasonic joining is improved.

The gap may include gaps on both sides in the facing direction. This configuration may further improve joining strength of the joining portion.

In the second metal, a joining mark may be formed by applying vibration of the ultrasonic joining along the facing direction. The fitting portion may extent from one end of the shaft in the major axis direction toward an outer diameter direction.

Another aspect of the technology disclosed herein is directed to a secondary battery including: an electrode body including a positive electrode and a negative electrode; a battery case housing inside the electrode body; and a positive electrode terminal and a negative electrode terminal electrically connected to the positive electrode and the negative electrode in the electrode body, respectively. In the secondary battery, at least one of the positive electrode terminal or the negative electrode terminal may include the terminal component disclosed herein.

Another aspect of the technology disclosed herein is directed to a method for manufacturing a terminal component used in secondary batteries. The method for manufacturing a terminal component includes: a providing step of providing a first metal and a second metal, wherein the second metal has a recess which is wider inside than an opening, and the first metal has a shaft having a pair of flat surfaces and a fitting portion formed at one end of the shaft in the major axis direction and fitted into the recess of the second metal; a crimping step of crimping the first metal and the second metal by press-fitting the fitting portion of the first metal into the recess of the second metal, wherein a gap is formed between the recess and the fitting portion in a facing direction in which the gap faces the flat surfaces in plan view; and a joining step of joining the first metal and the second metal by ultrasonic joining, wherein the vibration of the ultrasonic joining is applied along the facing direction.

DETAILED DESCRIPTION

The following describes an embodiment of a terminal component and a secondary battery disclosed herein. The embodiment described herein is naturally not intended to limit the present disclosure. Each drawing has been schematically illustrated and therefore may not necessarily reflect actual elements. The expression "A to B" indicating a numerical range means "A or more to B or less" unless otherwise specified. In the drawings described below, the same members/portions which exhibit the same action are denoted by the same reference numerals, and the duplicated descriptions may be omitted or simplified. The sign X in each drawing referenced herein indicates the "width direction," and the sign Y indicates the "length direction," the sign Z indicates the "height direction," and the sign U indicates a vibration direction of ultrasound vibration."

The "secondary battery" herein generally refers to an electricity storage device which causes a charging and discharging reaction by movement of charge carriers between a pair or electrodes (a positive electrode and a negative electrode) via an electrolyte. The "secondary battery" herein encompasses so-called secondary batteries such as a lithium-ion secondary battery, a nickel hydride battery and a nickel cadmium battery, and capacitors such as an electric double-layer capacitor. The following describes the embodiment targeting for a lithium-ion secondary battery among the secondary batteries.

<Lithium-Ion Secondary Battery 10>

Figure 1:
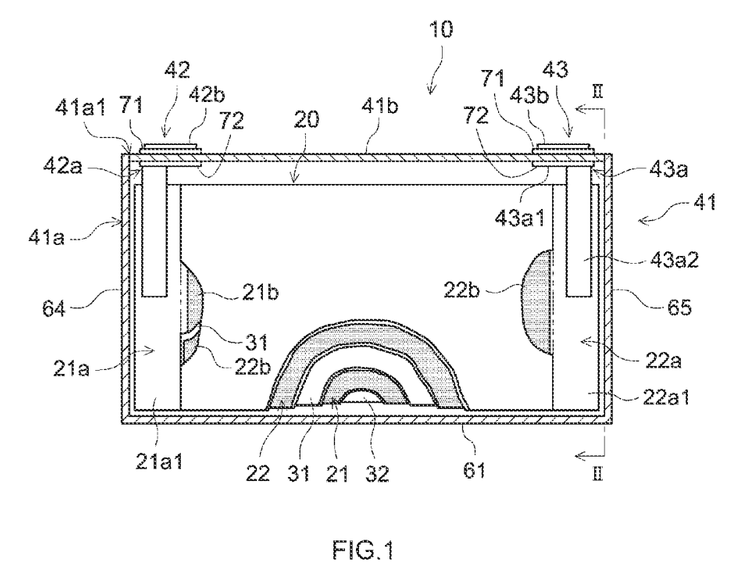
FIG. 1 is a partial cross-sectional view of a lithium-ion secondary battery 10.
Figure 2:
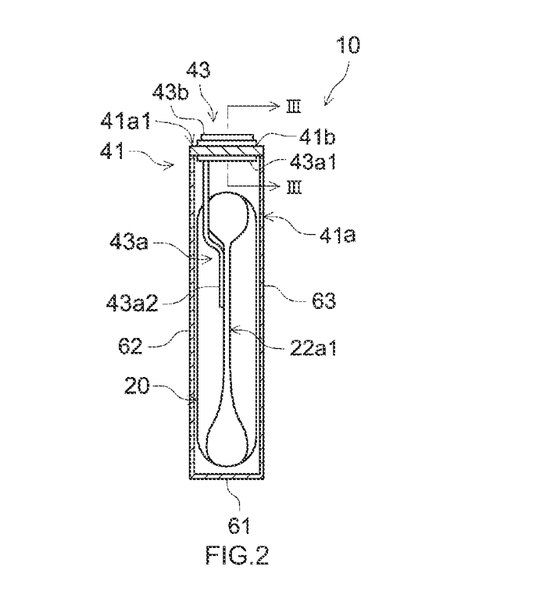
FIG. 2 is a cross-sectional view taken along line II-II of FIG. 1.

FIG. 1 is a partial cross-sectional view of a lithium-ion secondary battery 10. FIG. 1 shows the state where the inside of the lithium-ion secondary battery 10 is exposed along one wider surface of a substantially cuboid battery case 41. The lithium-ion secondary battery 10 shown in FIG. 1 is a so-called sealed battery. FIG. 2 is a cross-sectional view taken along line II-II of FIG. 1. FIG. 2 is a schematic partial cross-sectional view of the state where the inside of the lithium-ion secondary battery 10 is exposed along one narrower surface of a substantially cuboid battery case 41.

As shown in FIG. 1, the lithium-ion secondary battery 10 includes: an electrode body 20, a battery case 41, a positive electrode terminal 42, and a negative electrode terminal 43.

<Electrode Body 20>

The electrode body 20 is housed in the battery case 41 with being covered with an insulation film (not shown) or the like. The electrode body 20 includes a positive electrode sheet 21 as a positive electrode element, a negative electrode sheet 22 as a negative electrode element, and separator sheets 31 and 32 as a separator. The positive electrode sheet 21, the first separator sheet 31, a negative electrode sheet 22, and a second separator sheet 32 are each a long strip-like member.

In the positive electrode sheet 21, positive electrode active material layers 21b are formed on both surfaces of a positive electrode current collector foil 21a (e.g., an aluminum foil) having a predetermined width and a predetermined thickness except for an unformed portion 21a1 set to have a certain width at one end in the width direction. For lithium-ion secondary batteries, the positive electrode active material is, tier example, a material that can release lithium ions during charging and absorb lithium ions during discharging, such as a lithium transition metal composite. Various kinds besides the lithium transition metal composite material are generally proposed for the positive electrode active material, and there is no particular limitation on the positive electrode active material used herein.

In the negative electrode sheet 22, negative electrode active material layers 22b containing a negative electrode active material are formed on both surfaces of a negative electrode current collector foil 22a (here, a copper foil) having a predetermined width and a predetermined thickness except for a unformed portion 22a1 of the negative electrode current collector foil 22a set to have a certain width at one end in the width direction. For lithium-ion secondary batteries, the negative electrode active material is, for example, a material that absorbs lithium ions during charging and releases the absorbed lithium ions during discharging, such as natural graphite. Various kinds besides the natural graphite are generally proposed for the negative electrode active material, and there is no particular limitation on the negative electrode active material used herein.

The separator sheets 31 and 32 used may each be a porous resin sheets through which an electrolyte with a desired heat resistance can pass. Various kinds are proposed for the separator sheets 31 and 32, and there is no particular limitation on the separator sheets used herein.

The negative electrode active material layer 22h is formed to have a width greater than the width of the positive electrode active material layer 21b, for example. The widths of the separator sheets 31 and 32 are greater than that of the negative electrode active material layer 22b. The unformed portion 21a1 of the positive electrode current collector foil 21a and the unformed portion 22a1 of the negative electrode current collector foil 22a are disposed to face each other in the width direction. The positive electrode sheet 21, the first separator sheet 31, a negative electrode sheet 22, and a second separator sheet 32 are aligned in the length direction, and are wound up in turn on top of each other. The negative electrode active material layer 22b covers the positive electrode active material layer 21b with the separator sheets 31 and 32 interposed therebetween. The negative electrode active material layer 22h is covered with the separator sheets 31 and 32, The unformed portion 21a1 of the positive electrode current collector foil 21a protrudes from one side of the separator sheets 31 and 32 in the width direction. The unformed portion 22a1 of the negative electrode current collector foil 22a protrudes from the separator sheets 31 and 32 on the other side in the width direction.

As shown in FIG. 1, the above-mentioned electrode body 20 is flat along one plane including the winding axis so as to be housed in the case body 41a of the battery case 41. The unformed portion 21a1 of the positive electrode current collector foil 21a is disposed on one side, and the unformed portion 22a1 of the negative electrode current collector foil 22a is disposed on the other side, of the electrode body 20 along the winding axis.

<Battery Case 41>

The battery case 41 is, as shown in FIG. 1, houses the electrode body 20. The battery case 41 includes a case body 41a having an opening in one side surface and a substantially cuboid square shape, and a lid 41b attached to the opening. In this embodiment, the case body 41a and the lid 41b are formed of aluminum or an aluminum alloy mainly containing aluminum in order to reduce weight and ensure the required rigidity.

<Case Body 41a>

The case body 41a has an opening in one side surface and a substantially cuboid square shape. The case body 41a has a substantially rectangular bottom surface portion 61, a pair of wider surface portions 62 and 63 (see FIG. 2), and a pair of narrower portions 64 and 65. The pair of wider surface portions 62 and 63 are standing from the longer side of the bottom surface portion 61. The pair of narrower portions 64 and 65 are standing from the shorter side of the bottom surface portion 61. In one side surface of the case body 41a, an opening 41a1 surrounded by the pair of wider surface portions 62 and 63 and the pair of narrower portions 64 and 65 is formed.

<Lid 41b>

The lid 41b is attached to the opening 41a1 in the case body 41a surrounded by longer sides of the pair of wider surface portions 62 and 63 (see FIG. 2) and shorter sides of the pair of narrower portions 64 and 65. The outer edge of the lid 41b is bonded to the edge of the opening 41a1 of the case body 41a. Such joining may be performed, for example, by continuous welding without gaps. Such welding can be achieved, for example, by laser welding.

In this embodiment, the positive electrode terminal 42 and the negative electrode terminal 43 are attached to the lid 41b. The positive electrode terminal 42 includes an inner terminal 42a and an outer terminal 42b. The negative electrode terminal 43 includes an inner terminal 43a and an outer terminal 43b. The inner terminals 42a and 43a are attached to the inside of the lid 41b via an insulator 72. The outer terminals 42b and 43b are attached to the outside of the lid 41b via a gasket 71. The inner terminals 42a and 43a extend into the case body 41a. The inner terminal 42a of the positive electrode is in connection with the unformed portion 21a1 of a positive electrode current collector foil 21a. The inner terminal 43a of the negative electrode is in connection with the unformed portion 22a1 of the negative electrode current collector foil 22a.

The unformed portion 21a1 of the positive electrode current collector foil 21a of the electrode body 20 and the unformed portion 22a1 of the negative electrode current collector foil 22a of the electrode body 20 are, as shown in FIG. 1, attached respectively to the inner terminals 42a and 43a attached to both sides of the lid 41b in the longitudinal direction. The electrode body 20 is housed in the battery case 41 with being attached to the inner terminals 42a and 43a attached to the lid 41b. A wound electrode body 20 is shown here as an example. The structure of the electrode body 20 is not limited to such a form. The structure of the electrode body 20 may have, for example, a lamination structure in which the positive electrode sheet and the negative electrode sheet are stacked alternately with separators interposed therebetween. The battery case 41 may house a plurality of electrode bodies 20.

The battery case 41 may house an electrolyte (not shown) together with the electrode body 20. The electrolyte used may be a nonaqueous electrolyte obtained by dissolving a supporting electrolyte in a nonaqueous solvent. Examples of the nonaqueous solvent include carbonate-based solvents such as ethylene carbonate, dimethyl carbonate, and ethyl methyl carbonate. Examples of the supporting electrolyte include fluorine-containing lithium salts such as $LiPF_6$.

Figure 3:
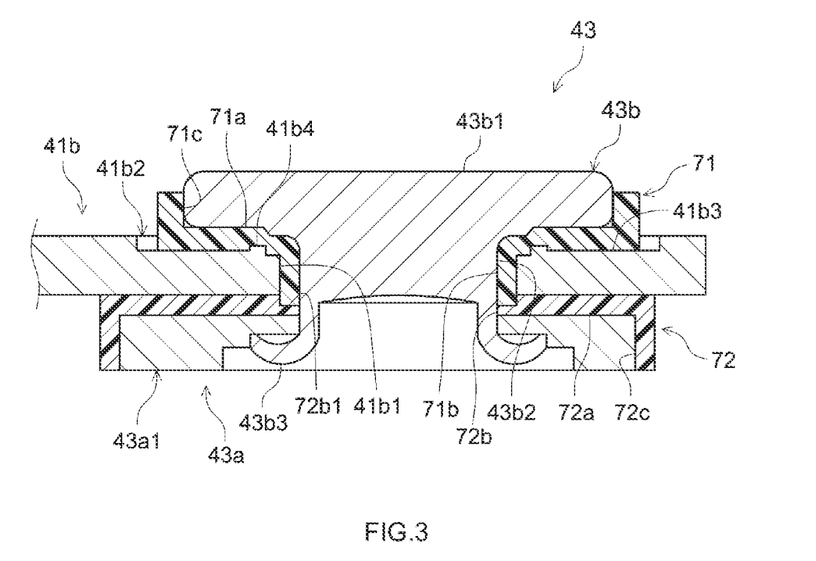
FIG. 3 is a cross-sectional view taken along line III-III of FIG. 2.

FIG. 3 is a cross-sectional view taken along line III-III of FIG. 2. FIG. 3 shows the cross section of a portion where the negative electrode terminal 43 is attached to the lid 41b. In this embodiment, a member to which a dissimilar metal has been bonded is used for the external terminal 43b of the negative electrode. FIG. 3 does not show the structure of the dissimilar metal constituting the external terminal 43b and the interface of the dissimilar metal, and schematically shows the cross-sectional shape of the external terminal 43b.

As shown in FIG. 3, the lid 41b has an attachment hole 41b1 attached to the external terminal 43b of the negative electrode. The attachment hole 41b1 passes through the lid 41b at a predetermined position of the lid 41b. The inner terminal 43a and the external terminal 43b of the negative electrode are attached to the attachment hole 41b1 of the lid 41b with a gasket 71 and an insulator 72 interposed therebetween. The outside of the attachment hole 41b1 is provided with a step 41b2 for attaching the gasket 71 to the periphery of the attachment hole 41h1. The step 41b2 is provided with a seat surface 41b3 on which the gasket 71 is disposed. The seat surface 41b3 is provided with a projection 41b4 for positioning the gasket 71.

The external terminal 43b of the negative electrode includes a head 43b1, a shall 43b2, and a crimping piece 43b3, as shown in FIG. 3. The head 43b1 is a portion disposed outside the lid 41b. The head 43b1 is a substantially flat portion larger than the attachment hole 41b1. The shaft 43b2 is a portion attached to the attachment hole 41b1 via the gasket 71. The shaft 43b2 protrudes downward from a substantially center portion of the head 43b1, As shown in FIG. 3, the crimping piece 43b3 is a portion crimped in the lid 41b by the inner terminal 43a of the negative electrode. The crimping piece 43b3 extends from the shaft 43b2, inserted into the lid 41b and then bent and crimped by the inner terminal 43a of the negative electrode.

<Gasket 71>

As shown in FIG. 3, the gasket 71 is a portion attached to the attachment hole 41b1 and the seat surface 41b3 of the lid 41b. In this embodiment, the gasket 71 includes a seat portion 71a a boss 71a, and a side wall 71c. The seat portion 71a is a portion attached to the seat surface 41b3 provided on the outer surface around the attachment hole 41h1 of the lid 41b. The seat portion 71a has a substantially flat surface to match the seat surface 41h3. The seat portion 71a has a recess corresponding to the projection 41b4 of the seat surface 41b3. The boss 71b protrudes from the bottom surface of the seat portion 71a. The boss 71b has an outer shape along the inner surface of the attachment hole 41h1 so as to be attached to the attachment hole 41b1 of the lid 41b. The inner surface of the boss 71b forms an attachment hole to which the shall 43b2 of the external terminal 43b is attached. The side wall 71c is standing from the periphery of the seat portion 71a. The head 43b1 of the external terminal 43b is attached to the site surrounded by the side wall 71c of the gasket 71.

The gasket 71 is disposed between the lid 41b and the external terminal 43b, and ensures insulation between the lid 41b and the external terminal 43b. The gasket 71 ensures the airtightness of the attachment hole 41b1 in the lid 41b. In light of this, materials with excellent chemical resistance and weather resistance are suitably used. In this embodiment, PFA is used for the gasket 71. PFA is a tetrafluoroethylene perfluoroalkylvinylether copolymer. The material used for the gasket 71 is not limited to PFA.

<Insulator 72>

The insulator 72 is a member that is attached to the inside of the lid 41b around the attachment hole 41b1 of the lid 41b. The insulator 72 includes a base 72a, a hole 72b, and a side wall 72c. The base 72a is a portion disposed along the inner surface of the lid 41b. In the present embodiment, the base 72a is a substantially flat plate-shaped portion. The base 72a is disposed along the inner surface of the lid 41b, and is large enough not to protrude from the lid 41b so as to be housed in the case body 41a. The hole 72b is provided to correspond to the inner surface of the boss 71b of the gasket 71. In the present embodiment, the hole 72b is provided in the substantially center portion of the base 72a, On the side surface facing the inner surface of the lid 41b, a recessed step 72h1 is provided around the hole 72b. The tip of the boss 71b of the gasket 71 attached to the attachment hole 41b1 is fit in the step 72b1 so that the step 72b1 does not interfere. The side wall 72c is standing from the outer edge of the base 72a. A basal portion 43a1 provided at one end of the inner terminal 43a of the negative electrode is fitted to the base 72a. The insulator 72 suitably has an appropriate chemical resistance because of being disposed inside the battery case 41. In the present embodiment, PPS is used for the insulator 72. PPS is a polyphenylene sulfide resin. The material for the insulator 72 is not limited to PPS.

The inner terminal 43a of the negative electrode includes a basal portion 43a1 and a connection piece 43a2 (see FIGS. 1 and 2). The basal portion 43a1 is a portion attached to the base 72a of the insulator 72. In this embodiment, the basal portion 43a1 has a shape corresponding to the inner side of the side wall 72c around the base 72a of the insulator 72. The connection piece 43a2 extends from one end of the basal portion 43a1 into the case body 41a to be connected to the unformed portion 22a1 of the negative electrode of the electrode body 20 (see FIGS. 1 and 2).

In this embodiment, the gasket 71 is attached to the outside of the lid 41b while the boss 71b is attached to the attachment hole 41b1. The external terminal 43b is attached to the gasket 71. In this case, the shaft 43h2 of the external terminal 43h is inserted into the boss 71b of the gasket 71, and the head 43b1 of the external terminal 43b is disposed on the seat portion 71a of the gasket 71. The insulator 72 and the negative electrode terminal 43 are attached to the inside of the lid 41b. As shown in FIG. 3, the crimping piece 43b3 of the external terminal 43b is bent and crimped to the basal portion 43a1 of the negative electrode terminal 43. The crimping piece 43b3 of the external terminal 43b and the basal portion 43a1 of the negative electrode terminal 43 may be partially bonded to each other by welding or metal joining to improve electroconductivity.

In the inner terminal 42a (see FIG. 1) of the positive electrode of the lithium-ion secondary battery 10, the necessary level of oxidation-reduction resistance is not as high as that in the positive electrode. In order to obtain required oxidation-reduction resistance and reduce weight, aluminum may be used for the inner terminal 42a of the positive electrode. In contrast, the inner terminal 43a of the negative electrode requires a e level of oxidation-reduction resistance than the positive electrode. In light of this, copper is used for the inner terminal 43a of the negative electrode. On the other hand, aluminum or an aluminum alloy can be used in the bulbar to which the external terminal 43b is connected in order to reduce weight and cost.

The present inventors have been considering the use of different kind of metal for the portion connected to the inner terminal 43a and the portion connected to the busbar. In other words, the present inventors have been considering the use of metal having high weldability for a portion connected to the bulbar and the portion connected to the inner terminal 43a in the external terminal 43b. However, based on the knowledge of the present inventors, dissimilar metal joining poses challenges to electroconductivity and joining strength. The present inventors have been considering metallurgical joining to ensure metal-to-metal electro-conduction and metal-to-metal crimping to increase the joining strength between metals. The following describes a terminal component 200 disclosed, herein together with the method for manufacturing the terminal component 200.

<Terminal Component 200>

Figure 4:
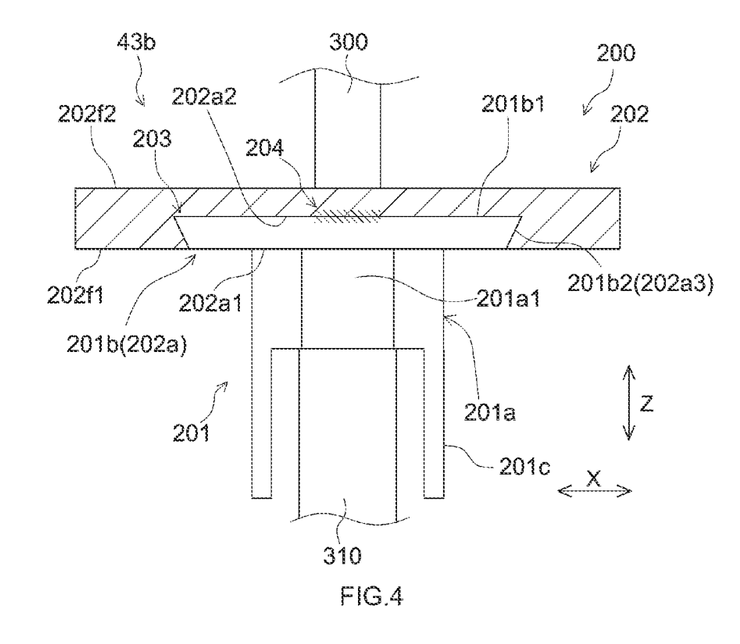
FIG. 4 is a schematic cross-sectional view of a terminal component 200.
Figure 5:
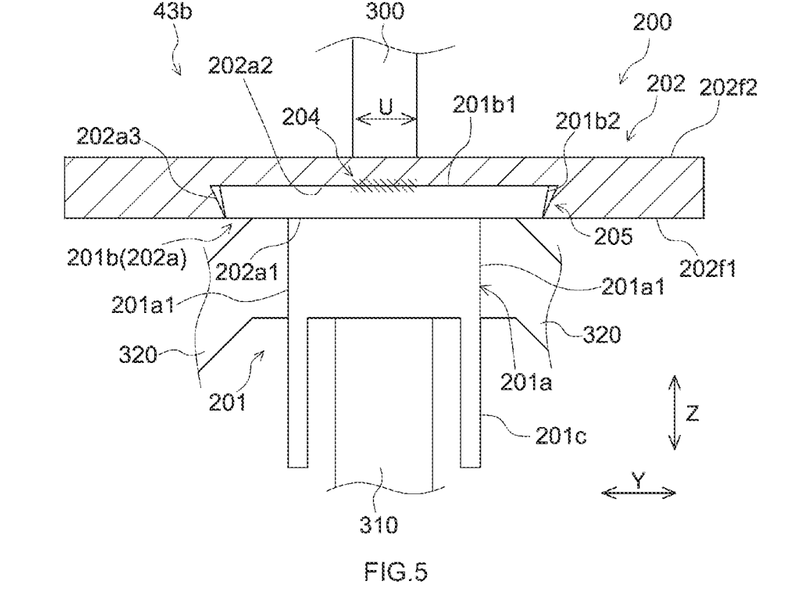
FIG. 5 is a schematic cross-sectional view of a terminal component 200.
Figure 6:
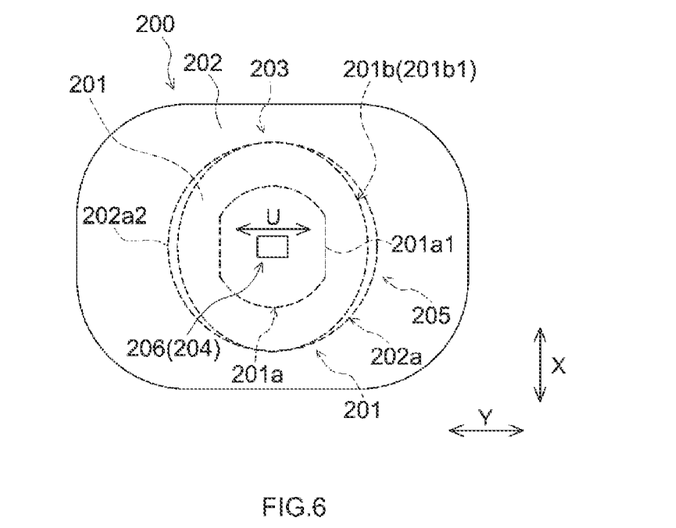
FIG. 6 is a schematic view of shapes of a recess 202a and a fitting portion 201b.

FIGS. 4 and 5 are schematic views of the terminal component 200. FIG. 6 is a schematic view of shapes of a recess 202a and a fitting portion 201b. The terminal component 200 may be used as the external terminal 43b for the negative electrode shown in FIG. 3. FIGS. 4 and 5 schematically shows the step of joining, by ultrasonic joining, the first metal 201 and the second metal 202 constituting the terminal component 200. FIG. 4 shows the terminal component 200 viewed from the Y direction (i.e., the length direction of the second metal 202). FIG. 5 shows the terminal component 200 viewed from the X direction (i.e., the width direction of the second metal 202). FIGS. 4 and 5 each show the cross section of the second metal 202. In FIG. 4, the fixing jig 320 is not shown.

The terminal component 200 includes a first metal 201, and a second metal 202 having a recess 202a as shown in FIG. 4. At the boundary between the first metal 201 and the second metal 202, a joining portion 204 joined by ultrasonic joining and a crimping portion 203 where the fitting portion 201b of the first metal 201 enters the recess 202a of the second metal 202. A gap 205 is formed between the recess 202a and the fitting portion 201b in the facing direction in which the gap 205 faces the flat surfaces 201a1 to be described later in plan view (see FIG. 5), The first metal 201 constitutes a portion disposed in the battery case 41 (see FIGS. 1 and 2) of the terminal component 200 and connected to the inner terminal 43a (see FIG. 3) of the negative electrode. The second metal 202 constitutes a portion exposed to outside of the battery case 41 (see FIG. 1) of the terminal component 200, and connected to an outside connection component such as a busbar. In this embodiment, the first metal 201 consists of copper, and the second metal consists of aluminum.

The method for manufacturing a terminal component 200 disclosed herein includes the following steps (a) to (c):

(a) a providing step of providing a first metal 201 and a second metal 202;

(b) a crimping step of crimping the first metal 201 and the second metal 202 by press-fitting a fitting portion 201b of the first metal 201 into a recess 202a of the second metal 202; and (c) a joining step of joining the first metal 201 and the second metal 202 by ultrasonic joining.

<Step (a): Providing Step>

In the step (a), a first metal 201 and a second metal 202 are provided. The second metal 202 provided here has a recess 202a which is wider inside than an opening 202a1. The first metal 201 provided herein has a shaft 201a having a pair of flat surfaces 201a1, and a fitting portion 201b formed at one end of the shaft 201a in the major axis direction. The fitting portion 201b is a portion fitted into the recess 202a of the second metal 202.

In the embodiment, the shaft 201a of the first metal 201 has a substantially cylindrical shape where a pair of flat surfaces 201a1 is formed partially. The pair of flat surfaces 201a1 is a pair of surfaces that are pressed from both sides in the Y direction by using the fixing jig 320 (see FIG. 5) during ultrasonic joining. The fitting portion 201b extends from one end of the shaft 201a in the major axis direction toward the outer diameter direction, and has a so-called flange shape. The fitting portion 201b is formed continuously in the circumferential direction of the shaft 201a. The end 201b1 of the fitting portion 201h has an ellipse shape, and the X direction is the major axis direction, and the Y direction is a minor axis direction (see FIG. 6). The outer edge 201b2 of the fitting portion 201b is a tapered surface with an outer diameter which gradually decreases from the end 201b1 toward the inside in the axial direction. The first metal 201 further has a portion 201c which serves as a crimping piece 43b3 (see FIG. 3) crimped by the inner terminal 43a on the side opposite to the side on which the fitting portion 201b is provided.

The second metal 202 in this embodiment has a substantially rectangular plate shape having rounded corners in plan view (see FIG. 6). A recess 202a where the fitting portion 201b of the first metal 201 is housed is provided in the middle of one surface 202f1 of the second metal 202. The recess 202*a* in the second metal 202 is wider inside than the opening 202*a*1 as mentioned above. In other words, a space with a larger diameter than the opening 202*a*1 is formed inside the recess 202*a* In this embodiment, the opening 202*a*1 and the bottom 202*a*2 of the recess 202*a* each have a circular shape. That is, the recess 202*a* is a space formed into a conical trapezoidal shape. The side peripheral surface 202*a*3 of the recess 202*a* is a tapered surface which gradually narrows from the bottom 202*a*2 toward the opening 202*a*1.

In the subsequent joining step, a horn 300 for performing ultrasonic joining is applied to the surface 202*f*2 of the second metal 202 opposite to the surface 202*f*1 in which the recess 202*a* is provided. The surface 202*f*2 may be provided with a recess for positioning a portion to which the horn 300 is attached.

The dimensional relationship between the fitting portion 201*b* of the first metal 201 and the recess 202*a* of the second metal 202 may be set to dimensions with which the first metal 201 and the second metal 202 are crimped and fixed in a subsequent process. In this embodiment, the long diameter of the end 201*b*1 is a little longer than the diameter of the bottom 202*a*2 so that the crimping portion 203 is formed art both ends of the end 201*b*1 of the fitting portion 201*b* in the major axis direction (i.e., the X direction). The first metal 201 and the second metal 202 having such shapes can be provided by subjecting metals (in this embodiment, copper and aluminum) as materials of the members to known metal processing such as forging or cutting, for example.

<Step (b): Crimping Step>

In the step (b), the fitting portion 201*b* of the first metal 201 is press-fitted into the recess 202*a* of the second metal 202 to crimp the fitting portion 201*b* and the second metal 202. Here, a gap 205 is formed between the recess 202*a* and the fitting portion 201*b* in the facing direction in which the gap 205 faces the flat surfaces 201*a*1 in plan view.

First, the end 201*b*1 of the fitting portion 201*b* of the first metal 201 and the bottom 202*a*2 of the recess 202*a* of the second metal 202 are placed to face each other to overlay the first metal 201 and the second metal 202 on each other. In this embodiment, the overlaying is performed with the direction in which the shaft 201*a* of the first metal 201 faces the flat surfaces 201*a*1 coinciding with the length direction Y of the second metal 202 (see FIG. 6). Then, the first metal 201 and the second metal 202 are mutually pressurized with the required press pressure by using a press machine or the like. Thus, the first metal 201 and the second metal 202 are elastically deformed with one of them against the other. The fitting portion 201*h* of the first metal 201 enters the recess 202*a* to thrill a crimping portion 203. In the crimping portion 203, the outer edge 201*b*2 of the fitting portion 201*h* and the side peripheral surface 202*a*3 of the recess 202*a* are being press-fitted together. The dimensions of the first metal 201 and the second metal 202 are adjusted, as appropriate so that such as a crimping portion 203 is formed. The press pressure can be set, as appropriate, according to the shapes and the metal species of the first metal 201 and the second metal 202.

In this embodiment, as mentioned above, the bottom 202*a*2 of the recess 202*a* of the second metal 202 has a circular shape, and the end 201*b*1 of the fitting portion 201*b* of the first metal 201 has an ellipse shape. The crimping portion 203 is formed on both sides of the end 201*b*1 in the major axis direction. The first metal 201 and the second metal 202 are fixed to each other by the crimping portion 203. In this embodiment, the aluminum second metal 202 is elastically deformed against the copper first metal 201 to form the crimping portions 203. In this manner, the first metal 201 and the second metal 202 are crimped and mechanically fastened, whereby the joining strength between the first metal 201 and the second metal 202 is ensured.

As shown in FIG. 5, gaps 205 are formed in portions where the diameter of the fitting portion 201*b* of the first metal 201 is shorter than the diameter of the recess 202*a* of the second metal 202, In this embodiment, gaps 205 are formed on both sides of the end 201*b*1 of the fitting portion 201*b* in the minor axis direction (i.e., the facing direction in which the gaps 205 face the flat surfaces 201*a*1 in plan view).

<Step (c): Joining Step>

In the step (c), the first metal 201 and the second metal 202 are joined by ultrasonic joining. Here, the vibration of the ultrasonic joining is applied along the facing direction. Accordingly, a joining portion 204 is formed. The conditions for the ultrasonic joining are set, as appropriate, according to the metal species, dimensions, and the like of the first metal 201 and the second metal 202. Although not limited thereto, for example, the conditions may be set such that the amplitude is about 20 μm, the frequency is about 1.5 kHz to about 150 kHz, and the energy level is about 50 J to about 500 J applied to the object to be joined.

The ultrasonic joining is performed using a horn 300, an anvil 310, and a fixing jig 320. First, the first metal 201 with the second metal 202 overlaid thereon is disposed on the anvil 310. Then, as shown in FIG. 5, the fixing jig 320 is used to fix the first metal 201 by sandwiching it between a pair of flat surfaces 201*a*1. With the first metal 201 fixed, the horn 300 is applied to the second metal 202, and vibration of the ultrasound is applied while pressurizing. In this embodiment, the horn 300 is applied to the center portion 206 (see FIG. 6) of the second metal 202. The vibration direction U of the ultrasound vibrations is parallel to the direction (Y direction) in which the pair of flat surfaces 201*a*1 is fixed by the fixing jig 320. This allows reduction in the energy loss when applying the ultrasound vibration.

As shown in FIG. 6, the vibration direction U coincides with the direction in which the flat surfaces 201*a*1 face the gaps 205 in plan view. In other words, the vibration direction U coincides with the direction in which the gaps 205 are formed as viewed from the center portion 206. In the present inventor's knowledge, when two members are joined by ultrasonic joining, vibration is transmitted to the entire members to be joined in conjunction with ultrasound vibration applied to the joining interface to which the horn is applied. When two members are fastened without gaps, vibration is less likely to be transmitted to the entire members. As a result, the vibration at the joining interface is inhibited, which may result in reduction of the joining strength at the joining interface by ultrasonic, joining. In this embodiment, as mentioned above, the vibration direction U coincides with the direction in which the gaps 205 are formed. This makes vibration less likely to be inhibited, thereby a joining portion 204 with a high joining strength is formed. The gaps 205 formed may also allow deformation to be in the gaps 205 even when large energy is applied to the first metal 201 and the second metal 202 during ultrasonic joining. Accordingly, deformation of the outside shapes of the first metal 201 and the second metal 202 can be reduced.

The joining portion 204 is formed in a position corresponding to the center portion 206 to Which the horn 100 is applied. Further, a joining mark is formed in the center portion 206 of the second metal 202. The joining mark is formed when vibration of ultrasonic joining is applied along the facing direction. Therefore, in the joining mark, large burrs are formed on both sides of the joining mark in the vibration direction U, compared to the direction perpendicular to the vibration direction U.

In this manner, a terminal component 200 can be manufactured. The terminal component 200 includes a crimping portion 203 and a joining portion 204 joined by the ultrasonic joining at the interface between the first metal 201 and the second metal 202. At the crimping portion 203, the bonding strength between the first metal 201 and the second metal 202 is ensured. The joining portion 204 is subjected to solid-phase joining by ultrasonic joining, which ensures electroconductivity due to low electrical resistance. The terminal component 2011 can be used as a positive electrode terminal or a negative electrode terminal of the secondary battery.

In the terminal component 200 mentioned above, gaps 205 are formed between the recess 202a and the fitting portion 201b in the facing directions in which the gaps 205 face the flat surfaces 201a1 in plan view. This improves the joining strength of the joining portion 204 joined by ultrasonic joining. The improvement in the joining strength of the joining portion 204 allows maintaining of the electroconductivity of the first metal 201 and the second metal 202 for a long period of time. Further, deformation due to application of the energy by ultrasonic joining is reduced.

In the embodiment mentioned above, the gaps 205 are formed on both sides in the facing direction. This configuration makes the relative vibrations of the first metal 201 and the second metal 202 less inhibited. This may improve the joining strength of the joining portion 204.

In the embodiment mentioned above, the bottom 202a2 of the recess 202a of the second metal 202 has a circular shape, and the end 201b1 of the fitting portion 201b of the first metal 201 has an ellipse shape, but the present disclosure is not limited to this configuration. For example, the end 201b1 of the fitting portion 201b may have a partially cut circular shape.

Figure 7:
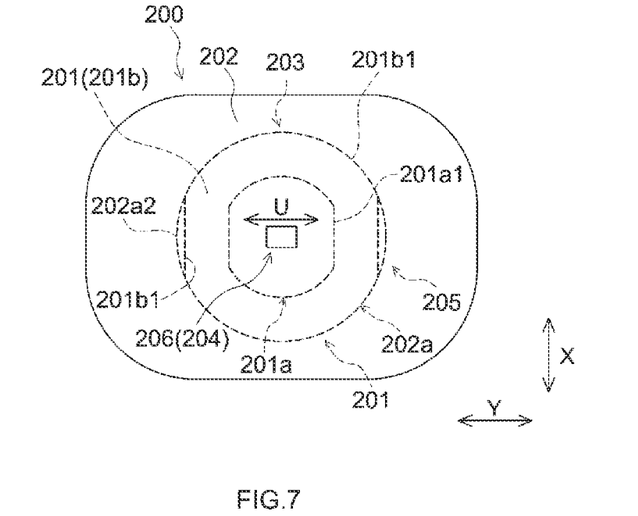
FIG. 7 is a schematic view of shapes of a recess 202a and a titling portion 201b of a terminal component 200 according to another embodiment.

FIG. 7 is a schematic view of shapes of a recess 202a and a fitting portion 201b of a terminal component 200 according to another embodiment. In the embodiment shown in FIG. 7, the recess 202a is a space formed into a conical trapezoidal shape. The shape of the fitting portion 201b matches the shape of the recess 202a except both ends in the Y direction. The fitting portion 201h has a shape in which both ends in the Y direction are cut in a straight line (so-called D-cut)

Figure 8:
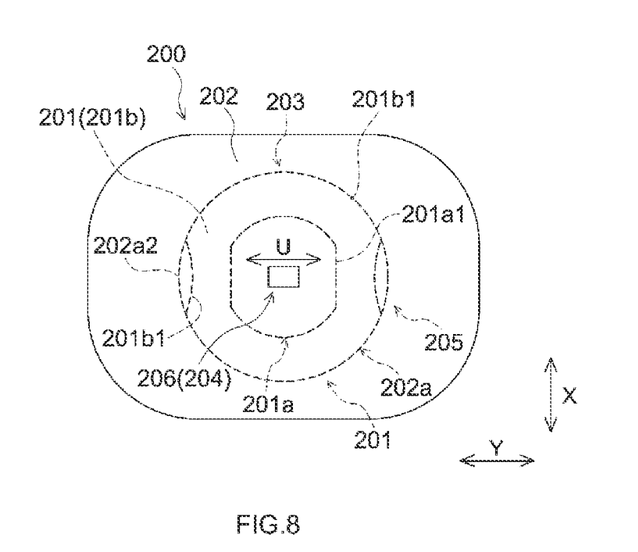
FIG. 8 is a schematic view of shapes of a recess 202a and a fitting portion 201b of a terminal component 200 according to another embodiment.

FIG. 8 is a schematic view of shapes of a recess 202a and a fitting portion 201b of a terminal component 200 according to another embodiment. In the embodiment shown in FIG. 8, the recess 202a is a space formed into a conical trapezoidal shape. The shape of the fitting portion 201b matches the shape of the recess 202a except both ends in the Y direction. The fitting portion 201b has a shape in which both ends in the Y direction are cut in an arc shape.

In the embodiment shown in FIGS. 7 and 8, gaps 205 are formed in portions cut in the circumferential direction, and a crimping portion 203 is fora-led in a portion excluding the cut portions. By making the direction in which gaps 205 are formed coincide with the vibration direction U, the joining strength of the joining portion joined by ultrasonic joining can be improved.

In the embodiment shown in FIGS. 6 to 8, gaps 205 are formed on both ends in the Y direction, but the present disclosure is not limited to this configuration. For example, the gap 205 may be formed in only one side of the facing direction in which the gap 205 faces the flat surfaces 201a1. Another gap may be formed in a portion other than the facing directions to the flat surfaces 201a1.

In the embodiment shown in FIGS. 6 to 8, the recess 202a of the second metal 202 is a space formed to be in a conical trapezoidal shape, and gaps 205 are formed between the recess 202a and the fitting portion 201b inside the conical trapezoidal shape, but the present disclosure is not limited to this configuration. For example, the filling portion may have a conical trapezoidal shape, and a portion of the recess may be widened with respect to the fitting portion so that gaps are formed outside the conical trapezoidal shape.

The terminal component, a secondary battery, and the method for manufacturing the terminal component disclosed herein have been described above in detail. Unless specifically mentioned, the embodiments of the terminal component and the battery described herein do not limit the present disclosure. In the battery disclosed herein, various modifications can be made, and each component and each process described herein can be omitted or combined as appropriate as long as no particular problem arises.

What is claimed is:

1. A terminal component for use in a terminal for secondary batteries, the terminal component comprising:
   a first metal; and
   a second metal having a recess,
   the first metal comprising:
      a shaft having a pair of flat surfaces; and
      a fitting portion formed at one end of the shaft in a major axis direction of the shaft, and extending toward an outward diameter direction, wherein
   at a boundary between the first metal and the second metal, a joining portion joined by ultrasonic joining and a crimping portion where the fitting portion of the first metal is fitted into the recess of the second metal are formed, wherein in the crimping portion at least a portion of an outer circumferential edge of the fitting portion and a side peripheral surface of the recess are press-fit together, and
   a gap is formed between the recess and the fitting portion in a facing direction in which the gap faces the flat surfaces of the shaft in plan view.

2. The terminal component according to claim 1, wherein the gap includes gaps on both sides in the facing direction.

3. The terminal component according to claim 1, wherein in the second metal, a joining mark is formed by applying vibration of the ultrasonic joining along the facing direction.

4. A secondary battery comprising:
   an electrode body including a positive electrode and a negative electrode;
   a battery case housing inside the electrode body; and
   a positive electrode terminal and a negative electrode terminal electrically connected to the positive electrode and the negative electrode in the electrode body, respectively, wherein
   at least one of the positive electrode terminal or the negative electrode terminal includes a terminal component comprising:
   a first metal; and
   a second metal having a recess,
   the first metal comprising:
      a shaft having a pair of flat surfaces; and
      a fitting portion formed at one end of the shaft in a major axis direction of the shaft, and extending toward an outer diameter direction, wherein
   at a boundary between the first metal and the second metal, a joining portion joined by ultrasonic joining and a crimping portion where the fitting portion of the first metal is fitted into the recess of the second metal are formed, wherein in the crimping portion at least a portion of an outer circumferential edge of the fitting portion and a side peripheral surface of the recess are press-fit together, and a gap is formed between the recess and the fitting portion in a facing direction in which the gap faces the flat surfaces of the shaft in plan view.

5. The secondary battery according to claim 4, wherein the gap includes gaps on both sides in the facing direction.

6. The secondary battery according to claim 4, wherein in the second metal, a joining mark is formed by applying vibration of the ultrasonic joining along the facing direction.

7. A method for manufacturing a terminal component for use in secondary batteries, the method comprising:

a providing step of providing a first metal and a second metal, wherein the second metal has a recess which is wider inside than an opening, and the first metal has a shaft having a pair of flat surfaces and a fitting portion formed at one end of the shaft in the major axis direction of the shaft, and extending toward an outward diameter direction and fitted into the recess of the second metal;

a crimping step of crimping the first metal and the second metal by press-fitting the fitting portion of the first metal into the recess of the second metal so as to form a crimping portion, wherein in the crimping portion at least a portion of an outer circumferential edge of the fitting portion and a side peripheral surface of the recess are press-fit together, wherein a gap is formed between the recess and the fitting portion in a facing direction in which the gap faces the flat surfaces of the shaft in plan view; and a joining step of joining the first metal and the second metal by ultrasonic joining, wherein vibration of the ultrasonic joining is applied along the facing direction.

* * * * *